US012508194B2

(12) United States Patent
Chen

(10) Patent No.: US 12,508,194 B2
(45) Date of Patent: Dec. 30, 2025

(54) GEAR-DRIVEN MASSAGER

(71) Applicant: Jiafeng Chen, Teng (CN)

(72) Inventor: Jiafeng Chen, Teng (CN)

( * ) Notice: Subject to any disclaimer, the term of this patent is extended or adjusted under 35 U.S.C. 154(b) by 19 days.

(21) Appl. No.: 19/001,429

(22) Filed: Dec. 25, 2024

(65) Prior Publication Data

US 2025/0195321 A1 Jun. 19, 2025

(30) Foreign Application Priority Data

Dec. 6, 2024 (CN) ......................... 202423006908.1

(51) Int. Cl.
*A61H 19/00* (2006.01)
*A61H 23/02* (2006.01)

(52) U.S. Cl.
CPC ......... *A61H 19/40* (2013.01); *A61H 23/0254* (2013.01); *A61H 2201/1215* (2013.01); *A61H 2201/14* (2013.01); *A61H 2201/1669* (2013.01); *A61H 2201/1678* (2013.01); *A61H 2201/1695* (2013.01)

(58) Field of Classification Search
CPC .......... A61H 19/00–50; A61H 23/0254; A61H 2201/1215; A61H 2201/14; A61H 2201/1669; A61H 2201/1678; A61H 2201/1695
USPC ............................................................ 601/46
See application file for complete search history.

(56) References Cited

U.S. PATENT DOCUMENTS 12,280,004 B1 * 4/2025 Zhao ...................... A61H 19/34
2010/0125228 A1 * 5/2010 Yao .................... A61H 23/0254
601/111
2010/0331744 A1 12/2010 Eitzen
2011/0196274 A1 8/2011 Ding et al.
2023/0057267 A1 * 2/2023 DAgostino ........ A61B 10/0012
2023/0201075 A1 * 6/2023 Zheng ................ A61H 23/0254
601/80
2023/0355466 A1 11/2023 Cheng
2024/0307261 A1 * 9/2024 Wang ..................... A61H 19/44
2024/0335350 A1 * 10/2024 Liu ...................... A61H 9/0007
(Continued)

FOREIGN PATENT DOCUMENTS

CN 105342819 A * 2/2016 ............. A61H 7/004
CN 106924021 A * 7/2017
WO WO-2019095545 A1 * 5/2019 ............... A61H 1/00

OTHER PUBLICATIONS

Translation of CN 105342819. (Year: 2015).*
Translation of CN 106924021. (Year: 2017).*
Translation of WO 2019/095545. (Year: 2019).*

*Primary Examiner* — Paige Kathleen Bugg
(74) *Attorney, Agent, or Firm* — Nitin Kaushik

(57) ABSTRACT

Disclosed is a gear-driven massager. The gear-driven massager comprises a housing and a soft rubber sleeve fitted on the housing, wherein the soft rubber sleeve is provided with massage beads raised outwards, a fixing plate is mounted in the housing, at least one main gear is mounted on the fixing plate, a movement chamber is formed between the fixing plate and an inner wall of the housing, massage rods are mounted in the movement chamber, the housing is provided with avoidance holes as many as the massage rods, ends of the massage rods protrude from the avoidance holes and are embedded in the massage beads, each massage rod is provided with a long opening, each main gear is provided with an eccentric rod.

8 Claims, 6 Drawing Sheets

(56) References Cited

U.S. PATENT DOCUMENTS

| | | | | |
|---|---|---|---|---|
| 2024/0382372 | A1* | 11/2024 | Zhou | A61H 23/006 |
| 2025/0134760 | A1* | 5/2025 | Liu | A61H 19/40 |

* cited by examiner

GEAR-DRIVEN MASSAGER

BACKGROUND OF THE INVENTION

Technical Field

The present disclosure relates to the technical fields of massagers and, in particular, to a gear-driven massager.

Description of Related Art

As we all known, the massager is a new generation of health care equipment developed according to physics, bionics, bioelectricity, traditional Chinese medicine and many years of clinical practice. In daily life, household appliances that massage parts of the human body with mechanical vibration by at least one at least one independent soft touch massage head can achieve many effects such as relaxing muscles, soothing nerves, promoting blood circulation, strengthening cell metabolism, enhancing skin elasticity, relieving fatigue, significantly reducing various chronic pain, acute pain and muscle soreness, relaxing the body, reducing pressure and removing skin wrinkles.

At present, most of the existing massagers have a simple vibrating massage function and structurally only relies on an internal vibration motor for vibrating massage, and a massage means can only act on one point, and can not massage multiple parts at the same time. As a result, when consumers use massagers, it is difficult to place the massagers in place at one time in order to accurately find the massage point of the human body. Moreover, it takes longer to relax the whole body, resulting in low massage efficiency.

BRIEF SUMMARY OF THE INVENTION

In view of the shortcomings of the prior art, an objective of the present disclosure is to provide a gear-driven massager.

In order to achieve the above objective, the present disclosure adopts the following technical solution:

A gear-driven massager, comprising a housing and a soft rubber sleeve fitted on the housing, wherein the soft rubber sleeve is provided with massage beads raised outwards, a fixing plate is mounted in the housing, at least one main gear is mounted on the fixing plate, a movement chamber is formed between the fixing plate and an inner wall of the housing, massage rods are mounted in the movement chamber, the housing is provided with avoidance holes as many as the massage rods, ends of the massage rods protrude from the avoidance holes and are embedded in the massage beads, each massage rod is provided with a long opening, each main gear is provided with an eccentric rod, the eccentric rod is arranged in the long opening, the housing is internally provided with a main board and a drive motor electrically connected with the main board, a rotating shaft of the drive motor is fixedly connected with an output gear, the output gear is connected with the main gear by a first transmission gear and drives the main gear to move, so that the massage rods do a reciprocating movement along the active cavity to massage the human body.

Preferably, when two or more massage rods are provided, the number of main gears is the same as the number of massage rods, and the main gears are connected by a second transmission gear.

Preferably, the orientation of the long openings is horizontal or vertical.

Preferably, when the orientation of the long openings is horizontal, the housing is provided with limit bayonets at the avoidance holes, and the rod bodies of the massage rods are placed in the limit bayonets so that the massage rods are only allowed to reciprocate in one direction to do a patting action.

Preferably, when the orientation of the long openings is vertical, one portion of each massage rod is hinged between the fixing plate and the housing so that the massage rods oscillate to and fro within a fixed range.

Preferably, the end of each massage rod is provided with a fixed head, the diameter of the fixed head is greater than the diameter of the massage rod, the fixed head is shaped like a cylinder, a sphere, a trapezoid, a special shape or a combination thereof, at least one fixed head is provided, and the fixed head is arranged in the massage bead and in interference fit with the massage bead; when in use, the fixed head is not separated from the massage bead and the power can be better transferred to the massage bead, thereby reducing the power loss and enhancing the massage experience.

Preferably, the soft rubber sleeve is provided with a deformation part around the massage beads, the thickness of the deformation part is less than the thickness of a main body of the soft rubber sleeve, and the deformation part is ripple-like, wavelike or pleated to increase the ductility and elasticity of the massage beads.

Preferably, each of the massage rods is unilaterally asymmetrical or bilaterally symmetric.

Preferably, at least one vibrating motor is provided in the housing, and the vibrating motor is located at a side end of the housing and is electrically connected with the main board; the housing is internally equipped with a battery and a key arranged on the main board, the battery is electrically connected with the main board, and a press portion of the key leans against the inner wall of the soft rubber sleeve.

Preferably, the battery is a rechargeable battery, the housing is provided with a charging contact, and the soft rubber sleeve is provided with an avoidance position corresponding to the charging contact.

Based on the above solution, the present disclosure can realize gear transmission by the drive motor and can simulate a high-speed and continuous patting or oscillating action by means of the linkage of the gears and eccentric rods, thereby quickly relieving muscle fatigue. The present disclosure also adopts a multi-point massage design, so that the massager can stimulate many parts of the body at the same time, thereby expanding the coverage area. It is convenient for the user to find the massage points accurately and the user can place the massager in place at one time. The transmission connection between gears can control the distribution of force, ensure the uniformity and continuity of the massage action, and avoid local overstimulation, so the present disclosure increases the efficiency and scope of the massage and improves the comfort of the massage.

DETAILED DESCRIPTION OF THE INVENTION

Figure 1:
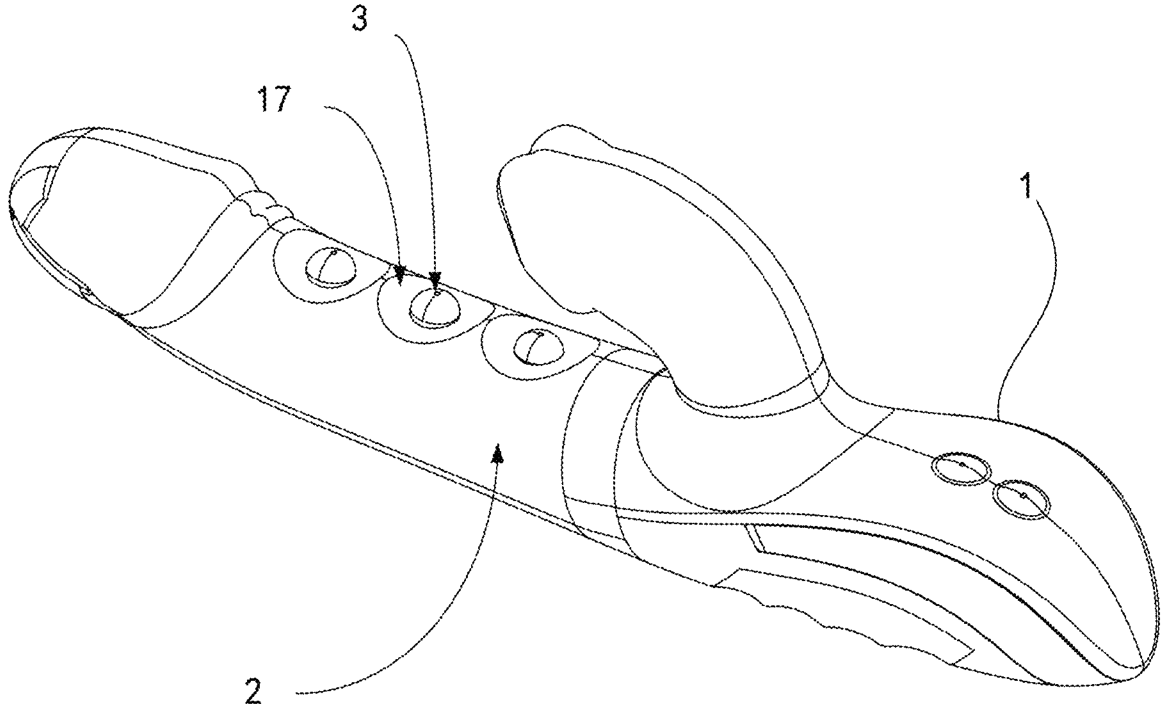
FIG. 1 is a schematic structural diagram of an embodiment of the present disclosure.
Figure 2:
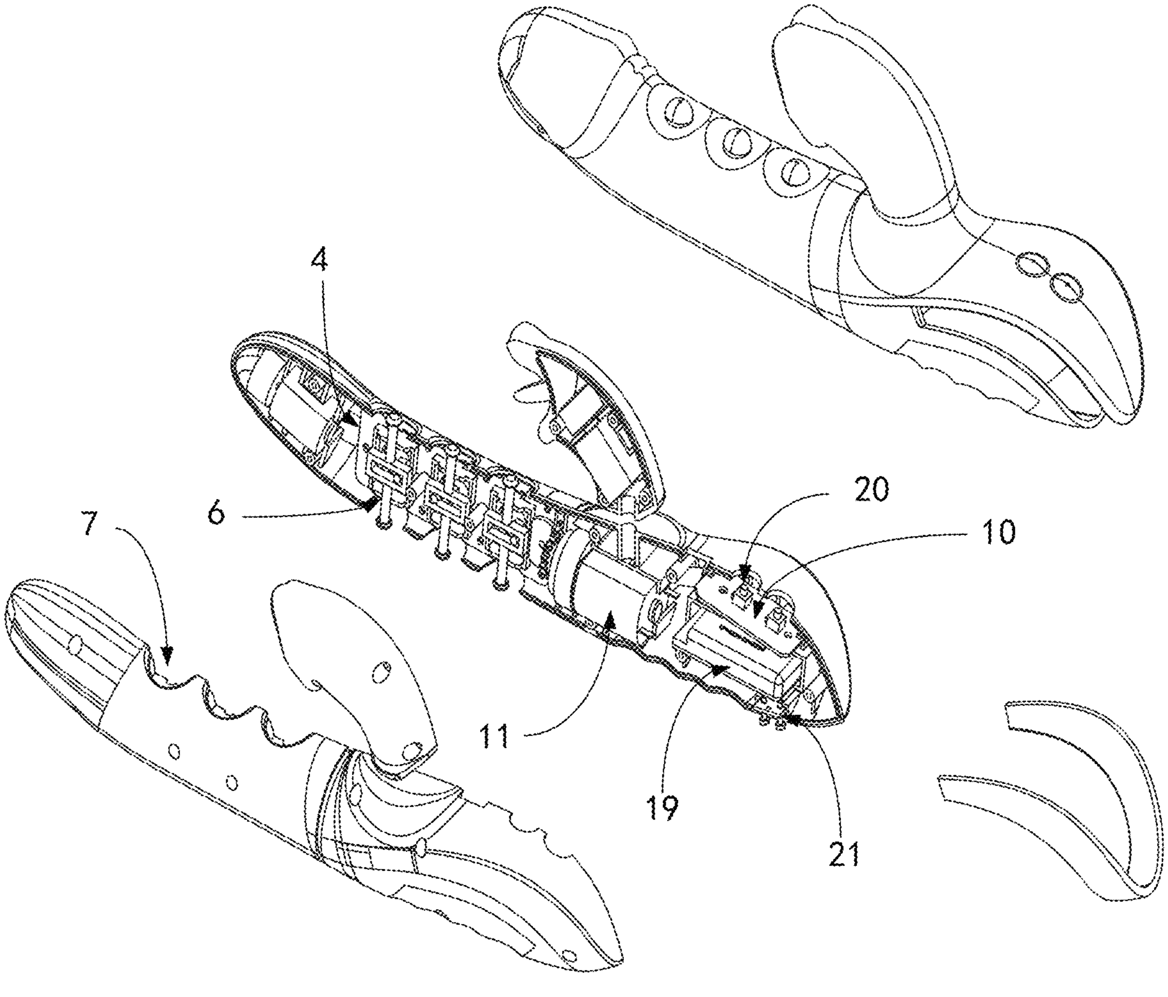
FIG. 2 is an exploded diagram of an embodiment of the present disclosure.
Figure 3:
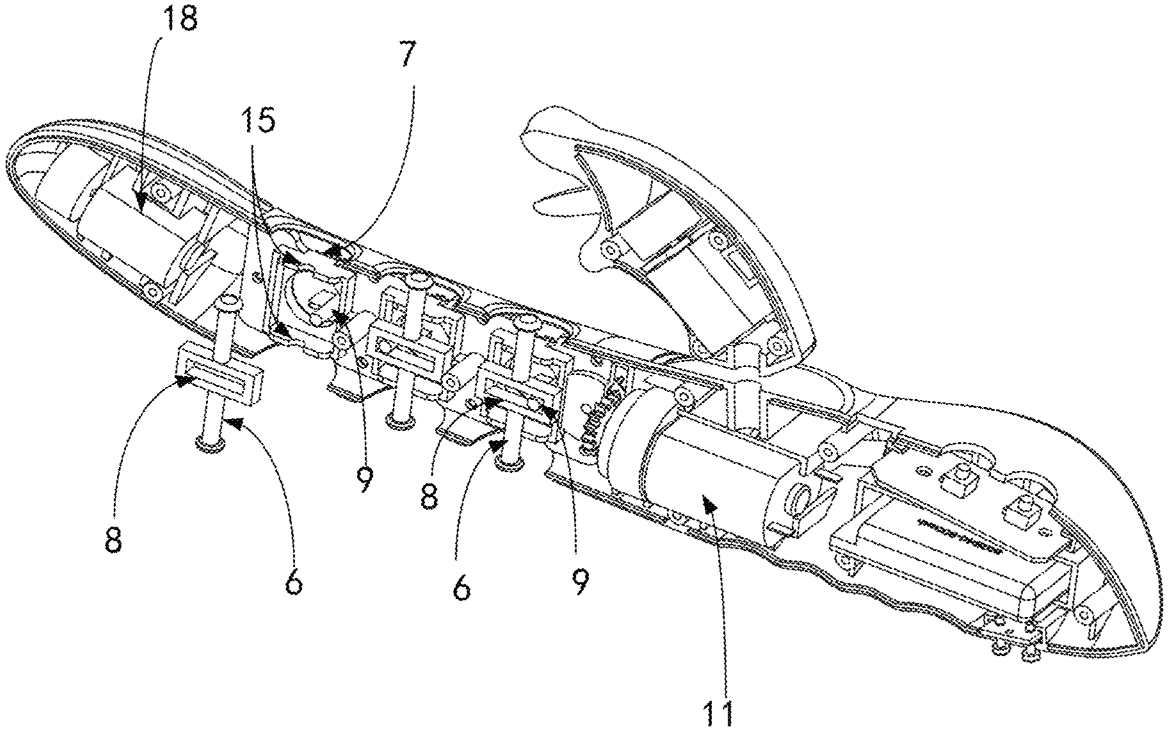
FIG. 3 is a schematic structural diagram of an embodiment of the present disclosure provided with horizontal long openings.
Figure 4:
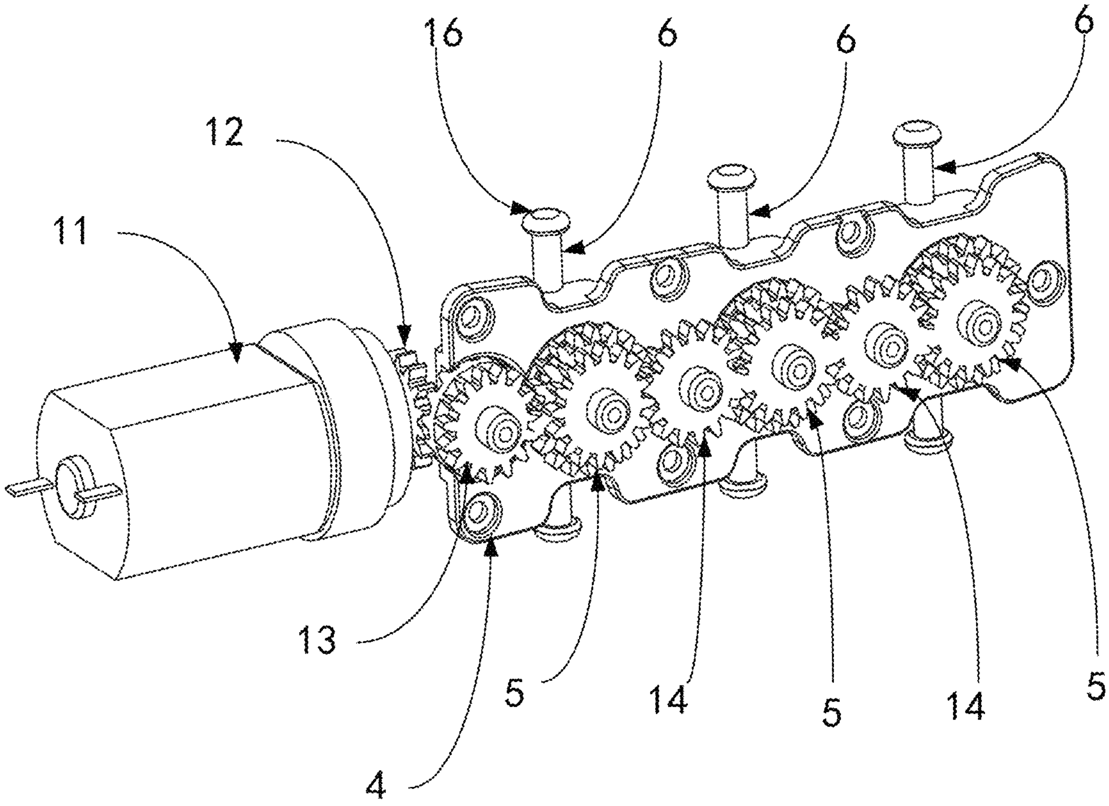
FIG. 4 is a schematic structural diagram of a gear transmission structure in an embodiment of the present disclosure.

In order to make the objective, technical solution and advantages of the present disclosure more clearly understood, the present disclosure is further described in detail in combination with the accompanying drawings and embodiments. It should be understood that the specific embodiments described herein are only intended to explain the present disclosure but not to define the present disclosure.

As shown in FIGS. 1-6, this embodiment provides a gear-driven massager, comprising a housing 1 and a soft rubber sleeve 2 fitted on the housing 1, wherein the soft rubber sleeve 2 is provided with massage beads 3 raised outwards, a fixing plate 4 is mounted in the housing 1, at least one main gear 5 is mounted on the fixing plate 4, a movement chamber is formed between the fixing plate 4 and an inner wall of the housing 1, massage rods 6 are mounted in the movement chamber, the housing 1 is provided with avoidance holes 7 as many as the massage rods 6, ends of the massage rods 6 protrude from the avoidance holes 7 and are embedded in the massage beads 3, each massage rod 6 is provided with a long opening 8, each main gear 5 is provided with an eccentric rod 9, the eccentric rod 9 is arranged in the long opening 8, the housing 1 is internally provided with a main board 10 and a drive motor 11 electrically connected with the main board 10, a rotating shaft of the drive motor 11 is fixedly connected with an output gear 12, and the output gear 12 is connected with the main gear 5 by a first transmission gear 13. When the drive motor 11 rotates, the output gear 12 rotates to drive the first transmission gear 13 to rotate synchronously, and then the rotating force is transferred to the main gears 5. After the main gears 5 rotate, the eccentric rods 9 eccentrically arranged on the main gears 5 move along a circular track, and because the eccentric rods 9 are located in the long openings 8, the massage rods 6 are forced to move, for example, in a reciprocating way to do a patting action or to oscillate to and fro. And also due to the deformation of the soft rubber sleeve 2, the user places the massager against the skin to massage the human body, increasing the massage parts and expanding the massage area.

Further, when two or more massage rods 6 are provided, the number of main gears 5 is the same as the number of massage rods 6, and the main gears 5 are connected by a second transmission gear 14. In this way, all the massage rods 6 can be driven by a single drive motor 11.

Figure 5:
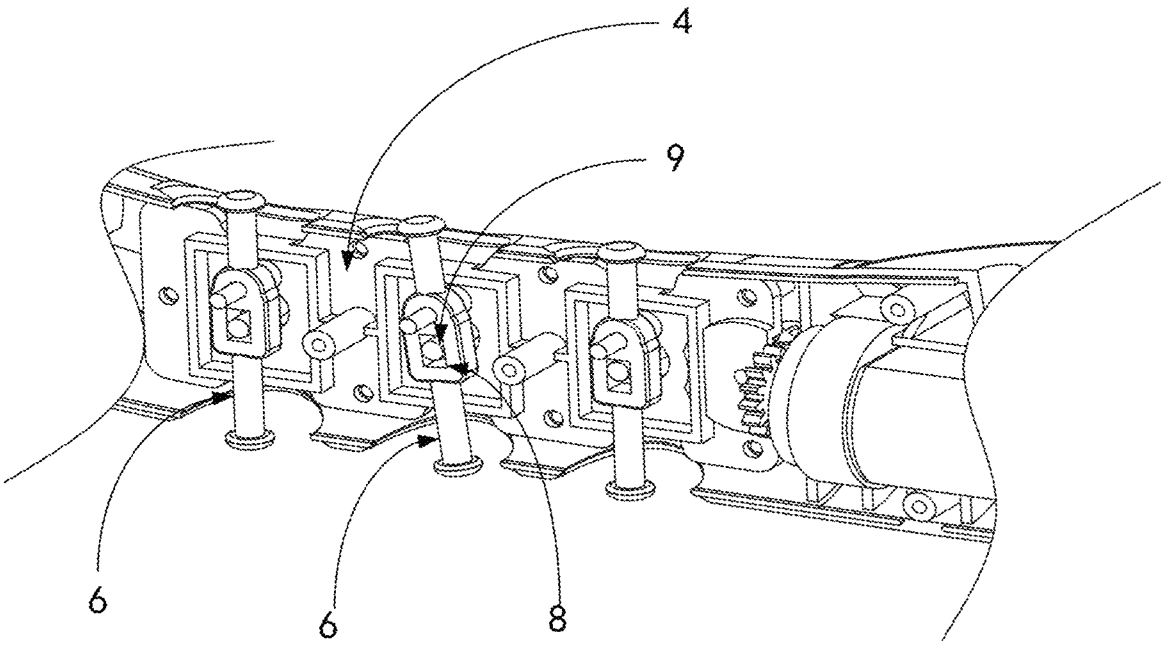
FIG. 5 is a schematic structural diagram of an embodiment of the present disclosure provided with vertical long openings.
Figure 6:
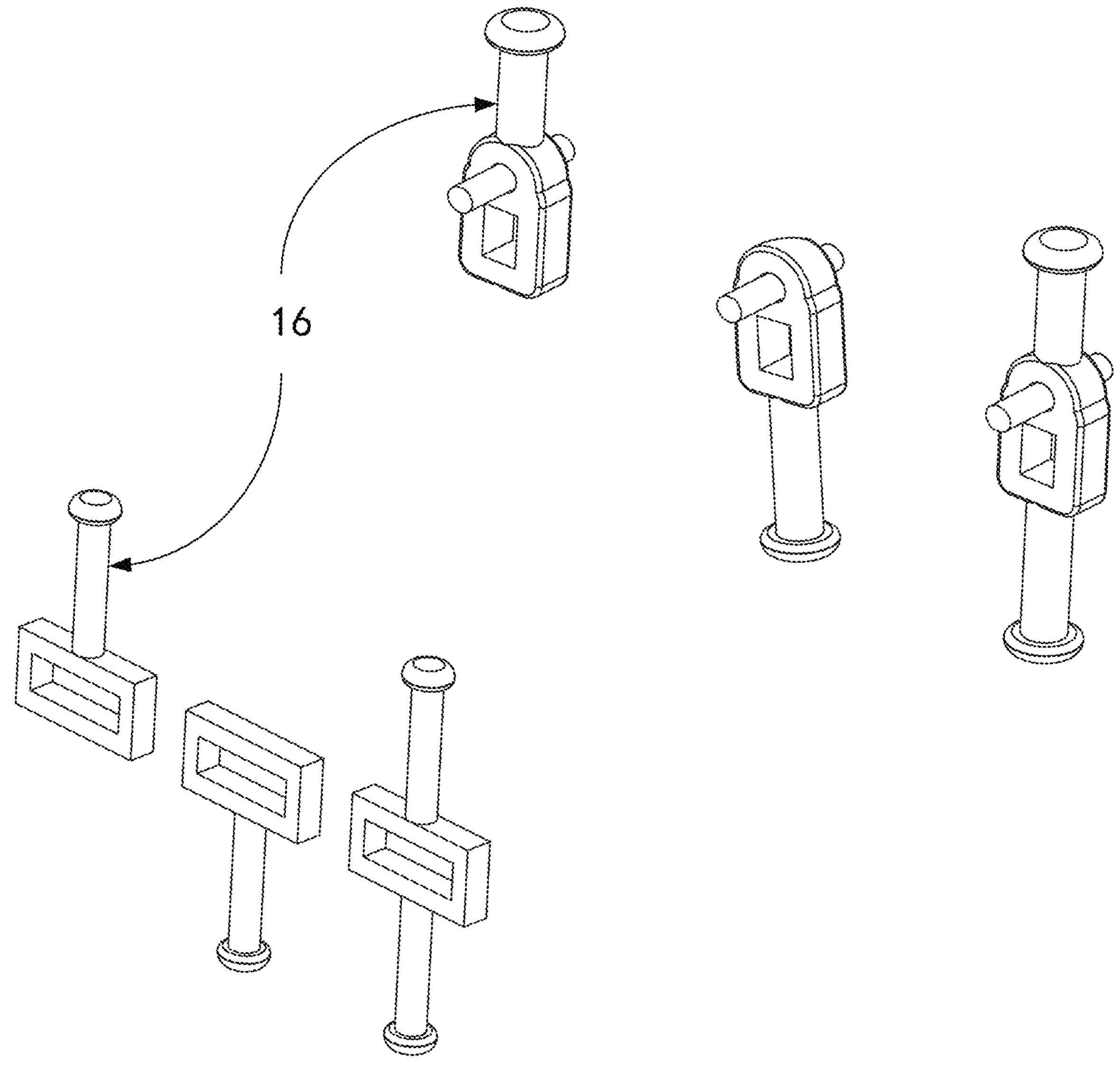
FIG. 6 is a schematic structural diagram of a unilaterally asymmetrical massage rod in an embodiment of the present disclosure.

Further, there are two massage action modes provided in this embodiment: one is patting mode and the other is oscillating mode. In order to achieve these two massage modes, different structural designs are required. Specifically, the orientation of the long openings 8 is designed to be horizontal or vertical. When the orientation of the long openings 8 is horizontal, the housing 1 is provided with limit bayonets 15 at the avoidance holes 7, and the rod bodies of the massage rods 6 are placed in the limit bayonets 15 so that the massage rods 6 are only allowed to reciprocate in one direction to do a patting action. When the orientation of the long openings is vertical, as shown in FIG. 5, one portion of each massage rod 6 is hinged between the fixing plate 4 and the housing 1 so that the massage rods 6 oscillate to and fro within a fixed range.

Further, in order to improve the patting effect, the end of each massage rod 6 in this embodiment is provided with a fixed head 16, the diameter of the fixed head 16 is greater than the diameter of the massage rod 6, the fixed head 16 is shaped like a cylinder, a sphere, a trapezoid, a special shape or a combination thereof, at least one fixed head 16 is provided, and the fixed head 16 is arranged in the massage bead 3 and in interference fit with the massage bead 3. In use, the fixed head 16 is not separated from the massage bead 3 and the power can be better transferred to the massage bead 3, thereby reducing the power loss and enhancing the massage experience.

Further, in order to allow the soft rubber sleeve 2 to achieve a better deformation effect near the massage beads 3, the soft rubber sleeve 2 in this embodiment is provided with a deformation part 17 around the massage beads 3, the thickness of the deformation part 17 is less than the thickness of a main body of the soft rubber sleeve 2, and the deformation part 17 is ripple-like, wavelike or pleated to increase the ductility and elasticity of the massage beads.

Further, the design of each massage rod 6 can be changed. Each of the massage rods 6 may be unilaterally asymmetrical or bilaterally symmetric. The "bilaterally symmetric" means presence of ends at both top and bottom. The "unilaterally asymmetrical" means presence of an end on only one side.

Further, in order to provide users with more massage options, at least one vibrating motor 18 is provided in the housing 1 in this embodiment. The vibrating motor 18 is located at a side end of the housing 1 and is electrically connected with the main board 10. Thus, users can make an option between a patting mode and a vibrating mode according to their preferences.

Further, as for an internal circuit system, the housing in this embodiment is internally equipped with a battery 19 and a key 20 arranged on the main board 10, the battery 19 is electrically connected with the main board 10, and a press portion of the key 20 leans against the inner wall of the soft rubber sleeve 2. The battery 19 is a rechargeable battery, the housing 1 is provided with a charging contact 21, and the soft rubber sleeve 2 is provided with an avoidance position corresponding to the charging contact 21. In this way, the massager can be handheld for use. Moreover, due to the function of charging, the massager can be reused many times, and the design of charging contact 21 is used for a charging plug, thereby achieving a waterproof function.

The above is only the preferred embodiment of the present disclosure, and does not therefore limit the scope of the patent of the present disclosure. All the equivalent structure or equivalent process transformations made by using the contents of the specification of the present disclosure and the accompanying drawings, or directly or indirectly applied in other related technical fields, are similarly included in the scope of patent of the present disclosure.

What is claimed is:

1. A gear-driven massager, comprising:

a housing and a soft rubber sleeve fitted on the housing, wherein the soft rubber sleeve is provided with massage beads raised outwards, a fixing plate mounted in the housing, a plurality of main gears mounted on the fixing plate, a movement chamber formed between the fixing plate and an inner wall of the housing, two or more massage rods mounted in the movement chamber, wherein the housing is provided with a plurality of avoidance holes, each avoidance hole corresponding with one of the two or more massage rods, an end of each massage rod protrudes from its respective avoidance hole, and is embedded in one of the massage beads, each massage rod is provided with a long opening, each main gear of the plurality of main gears is provided with an eccentric rod, each eccentric rod is arranged in a respective long opening, the housing is internally provided with a main board and a drive motor electrically connected with the main board, a rotating shaft of the drive motor is fixedly connected with an output gear, the output gear is connected with the plurality main gears via a first transmission gear, and drives the plurality of main gears to move, such that the two or more massage rods perform a reciprocating movement along the movement chamber configured to massage a human body, wherein each of the two or more massage rods is connected with one of the plurality of main gears, such that a number of the plurality of main gears is equal to a number of the two or more massage rods, and the plurality of main gears are connected by at least one second transmission gear.

2. The gear-driven massager according to claim 1, wherein an orientation of each long opening is horizontal or vertical.

3. The gear-driven massager according to claim 2, wherein the orientation of each long opening is horizontal, the housing is provided with limit bayonets at each of the plurality of avoidance holes, and rod bodies of the two or more massage rods are each respectively placed in one of the limit bayonets such that the two or more massage rods are only allowed to reciprocate in one direction to perform a patting action.

4. The gear-driven massager according to claim 2, wherein the orientation of each long opening is vertical, and one portion of each massage rod is hinged between the fixing plate and the housing such that the two or more massage rods oscillate to and fro within a fixed range.

5. The gear-driven massager according to claim 1, wherein the end of each massage rod is provided with a fixed head, a diameter of the fixed head is greater than a diameter of the massage rod, the fixed head is shaped like a cylinder, a sphere, or a trapezoid, each fixed head is arranged in a respective one of the massage beads, and in interference fit with its respective one of the massage beads;

in use, each fixed head is not separated from its respective one of the massage beads.

6. The gear-driven massager according to claim 1, wherein the soft rubber sleeve is provided with a deformation part around the massage beads, a thickness of the deformation part is less than a thickness of a main body of the soft rubber sleeve, and the deformation part is ripple-like, wavelike or pleated to increase ductility and elasticity of the massage beads.

7. The gear-driven massager according to claim 1, wherein each of the two or more massage rods is unilaterally asymmetrical or bilaterally symmetric.

8. The gear-driven massager according to claim 1, wherein at least one vibrating motor is provided in the housing, and the at least one vibrating motor is located at a side end of the housing and is electrically connected with the main board; the housing is internally equipped with a battery and a key arranged on the main board, the battery is electrically connected with the main board, and a press portion of the key leans against an inner wall of the soft rubber sleeve.

* * * * *